United States Patent Office 3,682,894
Patented Aug. 8, 1972

3,682,894
PROCESS FOR PREPARING 3-OXO-$\Delta^{4,6}$-STEROIDS
Hugh L. Dryden, Jr., Deerfield, Ill., assignor to G. D. Searle & Co., Chicago, Ill.
No Drawing. Filed Feb. 24, 1970, Ser. No. 13,795
Int. Cl. C07c 173/00
U.S. Cl. 260—239.57
6 Claims

ABSTRACT OF THE DISCLOSURE 3-oxo-$\Delta^{4,6}$-steroids are prepared from 3-hydroxy-$\Delta^5$-steroids by converting the $\Delta^5$-compounds to the chlorobromide, then oxidizing the hydroxy group to the ketone, and finally dehydrohalogenating to obtain the desired diene final product.

This invention relates to a novel process for preparing 3-oxo-$\Delta^{4,6}$-steroids. More particularly, it relates to a new, useful, and unobvious process for preparing steroids of the following general formula in rings A and B

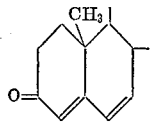

from the corresponding 3-hydroxy-$\Delta^5$-steroids.

3-oxo-$\Delta^{4,6}$-steroids are characterized by valuable pharmacological properties which include anabolic, androgenic, progestational, and anti-mineralocorticoid activity. Additionally, 3-oxo-$\Delta^{4,6}$-steroids serve as intermediates for the preparation of other compounds having valuable pharmacological properties. A typical example of the pharmacological utility of the dienes is the capacity of 3-(17$\beta$-hydroxy - 3 - oxoandrosta-4,6-dien-17$\alpha$-yl)propionic acid lactone (U.S. 2,900,383) to block the effects of desoxycorticosterone acetate on urinary sodium and potassium, while an example of the utility as intermediates is the fact that 3-(17$\beta$ - hydroxy-3-oxoandrosta-4,6-dien-17$\alpha$-yl)propionic acid lactone reacts with thioacetic acid to give 3-(7$\alpha$ - acetylthio - 17$\beta$-hydroxy-3-oxoandrost-4-en-17$\alpha$-yl) propionic acid lactone (U.S. 3,013,012), an anti-mineralocorticoid marketed as Aldactone® by G. D. Searle & Co., of Chicago, Ill.

The process to which this invention relates is distinguished from the prior art in one or more of the following particulars:

(1) It makes use of relatively inexpensive and readily available 3-oxy-$\Delta^5$-steroids as starting materials.
(2) It affords high yields for the overall process.
(3) It is relatively free from undesirable side reactions, especially those involving the double bond at the 5-position.

Among the various prior art processes for preparing 3-oxo-$\Delta^{4,6}$-steroids, one early procedure involved contacting a 3-hydroxy-$\Delta^5$-steroid with manganese dioxide. However, this process is frequently undesirable because of low yields (illustratively of the order of 30%) and the susceptibility of such common substituents as a 17$\beta$-hydroxyl, or a secondary hydroxyl in any position, to degradative attack under the conditions of the reaction.

Another one-step method for preparing 3-oxo-$\Delta^{4,6}$-steroids is the so-called Wettstein-Oppenauer oxidation of 3-hydroxy-$\Delta^5$-steroid with a benzoquinone and an aluminum alkoxide. This process suffers from two of the same defects which characterize the manganese dioxide process, viz, low yields (of the order of 40-50% under optimum conditions) and side reactions (e.g., formation of tarry material attributed to use of the benzoquinone).

A multi-step method of preparing 3-oxo-$\Delta^{4,6}$-steroids comprises the addition of bromine to a 3-hydroxy-$\Delta^5$-steroid, oxidizing the resulting 3-hydroxy-5,6-dibromo compound to the corresponding 3-oxo derivative with chromium trioxide, and then dehydrobrominating. This process is undesirable because of such side reactions as (a) unselective bromination of double bonds present and (b) tar formation during dehydrobromination. A further disadvantage of this process and any similar process involving a 5,6-dibromo compound is the fact that debromination can occur readily and thus reduce the amount of material available for dehydrobromination with a resultant reduction in the overall yield of product. In addition, the final dienes obtained by processes of this type involving bromine are contaminated with bromine-containing impurities. In the case of 3-(17$\beta$-hydroxy-3-oxoandrosta-4,6-dien - 17$\alpha$ - yl)propionic acid lactone, this would reduce its value as an intermediate in the preparation of Aldactone®.

Bromine addition and dehydrobromination are also involved in yet another one-step method for preparing 3-oxo-$\Delta^{4,6}$-steroids. In this process, a 3-hydroxy-$\Delta^5$-steroid is heated with bromine (4.4 gram-atom per mole of steroid) and a hydrogen bromide acceptor such as magnesium oxide or lithium carbonate in an inert solvent. Thus, addition of bromine, oxidation of the 3-hydroxy group, and dehydrobromination take place in a single reaction mixture. Besides the fact that only a single step is involved, this method has the further advantage of giving 3-oxo-$\Delta^{4,6}$-steroids in high yields. However, this method suffers from the same disadvantage as other processes which involve bromine in that the final product is contaminated with bromine-containing impurities which are difficult to remove.

Other multi-step procedures for preparing 3-oxo-$\Delta^{4,6}$-steroids require the use of a 3-oxo-$\Delta^4$ intermediate, which is prepared by oxidizing a 3-hydroxy-$\Delta^5$-steroid with an aluminum alkoxide under Oppenauer conditions. The 3-oxo-$\Delta^4$-intermediate is then converted to a 3-oxo-$\Delta^{4,6}$-steroid by a variety of procedures, e.g., chloranil or manganese dioxide dehydrogenation, or bromination followed by dehydrobromination. Since the Oppenauer oxidation results in yields of approximately 80%, and since yields of known procedures for transformation of 3-oxo-$\Delta^4$ intermediates to yield 3-oxo-$\Delta^{4,6}$-steroids are generally less than 80%, overall yields are seldom greater than 60%. Moreover, such multi-step, low yield procedures, to the extent that a benzoquinone (e.g., chloranil), manganese dioxide, bromination, and/or dehydrobromination are involved, are subject to the deleterious side reactions characteristic thereof described above.

It has now been found that the desired diene can be prepared in excellent yield by making use of a 5,6-chlorobromide as an intermediate. This is then oxidized to give the corresponding 3-ketone and finally dehydrohalogenated to the diene. Use of the chlorobromides as intermediates has the advantages that there is little or no tendency for dehalogenation to take place and the final product is contaminated with only very small amounts of halogen-containing materials.

More specifically, in the present process, a 3-hydroxy-$\Delta^5$-steroid is reacted with a N-bromoalkanamide or a N-bromoimide and hydrogen chloride in an inert solvent to give the 5,6-chlorobromide. N-bromoacetamide and N-bromosuccinimide are particularly useful for preparing the chlorobromide although other similar compounds can be used.

Actually, in the preparation of the chlorobromide, it is not necessary to use hydrogen chloride per se. Materials, such as amine hydrochlorides, which readily give up the hydrogen chloride can be used in the reaction.

Particularly useful in this regard are the hydrochloride salts of weak heterocyclic amines such as pyridine and picoline.

A variety of inert solvents can be used in the reaction. Examples of such solvents are N,N-dimethylformamide, chloroform, and acetone. Under the particular conditions of the reactions, the acetone is not subject to bromination.

The chlorobromide obtained from the reaction is predominantly the 5α,6β-dihalo compound although small amounts of 5β- and 6α-halides may also be formed. As far as the major products are concerned, the proportions of 5α-chloro-6β-bromo and 5α-bromo-6β-chloro compounds obtained can vary depending on the particular nature of the reagents and solvent used in the preparation of the compound. However, this has no significant effect on the overall process and no attempt is made to separate any mixture of isomers. That is, the mixture obtained is used directly in the subsequent steps of the process.

In the second step of the present process, the chlorobromide or mixture of chlorobromides is oxidized to give the corresponding 3-ketone. The preferred reagent for this process is chromium trioxide. For this step, it is desirable that the intermediate chlorobromide contain little or no water which would serve to dilute the chromium trioxide thereby reducing its strength and decreasing the yield in this particular step.

In the final step of the present process, the 3-keto-5,6-dihalide is dehydrohalogenated to give the 4,6-diene. Magnesium oxide is a preferred reagent for this purpose because of its availability and because it provides good yields. However, tertiary aliphatic amines and hindered primary and secondary aliphatic amines can also be used in this step. The amines should have a boiling point of about 130° C. or higher to provide the best conditions for the dehydrohalogenation. Some preferred amines of this type are tri-n-butylamine, ethyldisopropylamine, collidine, dicyclohexylamine and tert-octylamine.

In a particularly preferred embodiment of the present process, 3 - (3β,17β-dihydroxyandrost-5-en-17α-yl)-propionic acid lactone is reacted with N-bromosuccinimide and α-picoline hydrochloride in acetone to give the 5,6-chlorobromide which is then oxidized with chromium trioxide to the 3-keto-5,6-chlorobromide and this is finally dehydrohalogenated with tri-n-butylamine in N,N-dimethylformamide in the presence of lithium bromide to give 3-(17β-hydroxy-3-oxoandrosta-4,6-dien-17α-yl)-propionic acid lactone.

The following examples are presented to illustrate the present invention and should not be construed as limiting it in any way. In the examples, where the specific location and configuration of the chloro and bromo substituents at the 5- and 6-positions is not specified, the material involved is a mixture of the isomers possible. Even where the location and configuration is specified, this does not preclude the possible presence of small amounts of the other isomers. In the examples, quantities are given in parts by weight unless parts by volume are specified; temperatures are given in degrees centigrade (° C.). The relationship between parts by weight and parts by volume is the same as that existing between grams and milliliters.

EXAMPLE 1A

A solution is prepared from 113 parts of α-picoline and 1200 parts of acetone and this solution is cooled to 5° C. The temperature is then maintained below 10° C. while 43.8 parts of hydrogen chloride gas is introduced over a period of 1 hour by means of an inlet tube which delivers the gas just above the surface of the liquid. When the addition is complete, the mixture is tested for the odor of picoline or whether it turns Alkacid paper orange. If this does not occur, a small amount of picoline is added to ensure the presence of a slight excess.

Next, 204.6 parts of 3-(3β,17β-dihydroxyandrost-5-en-17α-yl)propionic acid lactone is added to the solution and the resulting suspension is cooled to about 5° C. Then, as the mixture is being stirred, 117.6 parts of N-bromosuccinimide is added all at once and washed in with additional acetone. The reaction mixture becomes orange, the solid dissolves quickly, and the temperature rises to about 12–14° C. The cooling bath is then removed and the mixture is stirred for an additional 20 minutes while it warms up to about 20° C. Then, a cold solution of hydrochloric acid (made by adding 250 parts of concentrated hydrochloric acid to 200 parts of ice and 190 parts of cold water) is added to the reaction mixture with the temperature maintained below 30° C. A solid precipitates, 1200 parts of cold water is added, and the mixture is stirred at room temperature for 30 minutes.

The mixture is then heated on a steam bath under reduced pressure to distill off the acetone. The temperature of the mixture should not exceed 50° C. during this distillation. After the distillation of the acetone is complete, the mixture is cooled to room temperature and the solid is separated by filtration. It is washed thoroughly with cold water and sucked as dry as possible before it is air-dried at room temperature. The product obtained in this way is a mixture of 3-(5α-bromo-6β-chloro-3β,17β-dihydroxyandrostan-17α-yl)propionic acid lactone and 3-(5α-chloro - 6β - bromo - 3β,17β - dihydroxyandrostan-17α-yl) propionic acid lactone.

EXAMPLE 1B

The crude chlorobromo compound obtained in Example 1A is mixed with 1450 parts of acetone and the resulting suspension is cooled to 5° C. While the mixture is stirred and cooled, 210 parts by volume of Jones reagent is added over a period of about 20 minutes. The Jones reagent is prepared by dissolving 134.6 parts of chromic oxide in 370 parts of water and then cooling this solution periodically in an ice bath as 210 parts of concentrated sulfuric acid is added. The temperature of the chlorobromide solution is kept below 10° C. until near the end of the addition. During the oxidation, the mixture becomes thick but it subsequently thins out and can be stirred without difficulty. After the above addition is complete, the cooling bath is removed and an additional 60 parts by volume of Jones reagent is added and the mixture is stirred for 40 minutes. The temperature rises somewhat during this time. 95 parts of 2-propanol is added to the mixture to reduce the excess of Jones reagent and the mixture is distilled under reduced pressure at the same time to remove some of the acetone. Distillation is then continued, with heating on a steam bath, until about ½ of the acetone is removed. Then, 2000 parts of water is added gradually as the remaining acetone distills. When all of the acetone has been removed, the mixture is cooled and diluted with an additional 1000 parts of cold water. The suspended solid is then separated by filtration and washed well with cold water. The material is then spread on a tray and air-dried overnight. The material obtained in this way is a mixture of 3-(5α-bromo-6β-chloro-17β - hydroxy - 3 - oxoandrostan-17α-yl)propionic acid lactone and 3 - (5α - chloro - 6β - bromo-17β-hydroxy-3-oxoandrostan-17α-yl)propionic acid lactone.

EXAMPLE 1C

A mixture is prepared from 32 parts of lithium bromide, 152 parts of tri-n-butylamine and 1235 parts of N,N-dimethylformamide under nitrogen and, with the mixture at 25° C., 183 parts of the chlorobromo ketone obtained in Example 1B is added. 285 parts of N,N-dimethylformamide is used to assist in the addition of the ketone. The mixture is stirred under nitrogen for 1 hour during which time it warms to about 30° C. Then, it is heated rapidly to reflux and maintained at that temperature for 90 minutes. The bulk of the N,N-dimethylformamide is then distilled off under reduced pressure while the temperature is maintained below 100° C. The residual oil is then cooled somewhat and 480 parts of acetone is added. The residue dissolve completely and the solution is diluted with 400 parts of water containing 19 parts of concentrated hydrochloric acid. The solution is cooled to 25° C. and stirred for about 15 minutes. Much of the product crystallizes during this time and an additional 600 parts of water is added. The acetone is then distilled under reduced pressure and an additional 1000 parts of water is added to the stirred mixture. The mixture is then cooled to 25° C. and the product is sepaarted by filtration, washed well with cold water and air-dried. The product is 3-(17β-hydroxy-3-oxoandrosta - 4,6 - dien - 17α - yl)propionic acid lactone and the overall yield for the three steps (Example 1A–C) is 86.7%.

EXAMPLE 2A

A mixture of 12.2 parts of pyridine and 75 parts of chloroform is stirred and cooled to 5–10° C. and saturated with hydrogen chloride gas. Then, an additional 12 parts of pyridine is added to the mixture cooled to 0–5° C. 34.4 parts of 3-(3β,17β-dihydroxyandrost-5-en-17α-yl) propionic acid lactone is added to the mixture followed by 32 parts of dichloromethane. Then, 19.6 parts of N-bromosuccinimide is added to the cold stirred mixture during 3–4 minutes. The temperature rises to about 10° C. and the solid dissolves rapidly. The mixture is stirred at 15° C. for 20–25 minutes and 1 part of cyclohexene is added to consume excess N-bromosuccinimide. The mixture is then added to 37 parts of concentrated sulfuric acid mixed with an excess of ice. This is further diluted with water and the mixture is extracted with a 1:1 mixture of ethyl acetate and dichloromethane. The organic extracts are washed twice with water, once with 5% potassium carbonate solution, and once with brine and then dried over sodium sulfate. The solvent is then removed under reduced pressure and the solid residue is dried at 0.1 mm. pressure at 25° C. for 1 hour. The product obtained in this way is predominantly 3-(5α-bromo-6β-chloro - 3β,17β - dihydroxyandrostan - 17α - yl)propionic acid lactone.

EXAMPLE 2B

The chlorobromide obtained in Example 2A is oxidized with Jones reagent according to the procedure described in Example 1B to give 3-(5α-bromo-6β-chloro-17β-hydroxy - 3 - oxoandrostan - 17α - yl)propionic acid lactone. The 3-oxo compound obtained is added to a mixture of 330 parts of N,N-dimethylformamide, 20 parts of lithium bromide, and 20 parts of magnesium oxide which is heated and stirred at 130° C. 50 parts of N,N-dimethylformamide is used to assist in the addition of the ketone. The reaction mixture is then heated rapidly to reflux and maintained at this temperature for 75 minutes. It is then cooled to room temperature and added to ice mixed with 85 parts of concentrated hydrochloric acid. The resulting mixture is extracted with ethyl acetate and the combined extracts are washed with water, 5% potassium carbonate solution, and brine and then dried over sodium sulfate. The solution is then treated with charcoal and the solvent is removed under reduced pressure. The residue solidifies and is dried at 1 mm. pressure to give 3-(17β-hydroxy-3-oxoandrosta-4,6-dien-17α-yl)propionic acid lactone in an overall yield of 89% for the three steps (Examples 2A–B).

EXAMPLE 3

A mixture is prepared from 16 parts of pyridine and 200 parts of acetone and 7.3 parts of hydrogen chloride gas is introduced as the temperature is maintained at about 10° C. The mixture fumes during this addition but the fuming stops abruptly as the last of the gas is added which indicates that a slight excess of hydrogen chloride is present. An additional 2 parts of pyridine is then added to ensure an excess of this base. Then, 34.4 parts of 3-(3β,17β-dihydroxyandrost-5-en-17α-yl)propionic acid lactone is added and 50 parts of acetone is used to aid in the addition. The mixture is then cooled to 3° C. and 19.6 parts of N-bromosuccinimide is added all at once while the mixture is stirred and cooled in an ice bath. The mixture is then allowed to warm to 13° C. and about 25 parts of water is added to dissolve the solid that had formed. 42 parts of concentrated hydrochloric acid in 70 parts of water is then added while the mixture is maintained below 20° C. Then an additional 350 parts of water is added and the mixture is stirred at 20° C. for 30 minutes. The product is then isolated from this mixture according to the procedure in the final paragraph of Example 1A. The product is a mixture of the 5α-bromo-6β-chloro and the 5α-chloro-6β-bromo compounds as obtained in Example 1A.

EXAMPLE 4

A mixture is prepared from 330 parts of N,N-dimethylformamide, 8.0 parts of lithium bromide, and 35.0 parts of ethyldiisopropyl amine; this is heated to 100° C. and 43.7 parts of the chlorobromo ketone as obtained in Example 1B is added. 50 parts of N,N-dimethylformamide is used to assist in the addition. The mixture is then heated rapidly to reflux and maintained at reflux for 90 minutes. It is then cooled and the N,N-dimethylformamide is distilled off under reduced pressure while the temperature is maintained below 95° C. The resulting residue is then cooled and dissolved in 120 parts of acetone; 100 parts of water is added along with 25 parts of concentrated hydrochloric acid and the mixture is cooled to 25° C. The acetone is then removed by distillation at reduced pressure and an additional 250 parts of water is added. When all of the acetone has been removed, the resulting mixture is filtered to collect the product which is washed well with water and air-dried. This product is 3-(17β-hydroxy-3-oxoandrosta-4,6-dien-17α-yl)propionic acid lactone.

EXAMPLE 5

To 95 parts of cooled N,N-dimethylformamide there is added 22 parts of hydrogen chloride gas while the temperature is maintained at 5–10° C. To this solution is added 34.5 parts of 3-(3β,17β-dihydroxyandrost-5-en-17α-yl)-propionic acid lactone and then an additional 48 parts of N,N-dimethylformamide. The mixture is cooled to 8° C. and a solution of 15.2 parts of N-bromoacetamide in 48 parts of N,N-dimethylformamide is added over a period of 5 minutes, followed by the addition of an additional 88 parts of N,N-dimethylformamide. The temperature of the mixture is maintained below 15° C. during these additions. The mixture is stirred for 20 minutes at 10–12° C. and then added to 500 parts of ice. Then, 500 parts of water is added along with a small amount of sodium sulfite to reduce excess N-bromoacetamide. The reaction mixture is then extracted with a mixture of 530 parts of dichloromethane and 540 parts of ethyl acetate. The mixture is filtered to break emulsions, the organic layer is separated, and the aqueous layer is again extracted with 1:1 dichloromethane-ethyl acetate followed by 180 parts ethyl acetate. The organic extracts are combined, washed once with cold water and then dried over sodium sulfate. The solvent is removed under reduced pressure with the temperature maintained below 40° C. The residue is then stirred with 240 parts of acetone (in which it does not dissolve completely) and the resulting suspension is diluted with 350 parts of water and stirred for 30 minutes. The solid material is separated by filtration and dried to give a mixture of 3-(5α-bromo-6β-chloro-3β,17β-dihydroxyandrostan-17α-yl)propionic acid lactone and 3-(5α-chloro-6β-bromo-3β,17β-dihydroxyandrostan-17α -yl)propionic acid lactone.

The mixture of chlorobromides obtained above is oxidized with Jones reagent and then dehydrohalogenated using tri-n-butylamine according to the procedures described in Examples 1B and 1C to give 3-(17β-hydroxy-3-oxoandrosta-4,6-dien-17α-yl)propionic acid lactone.

EXAMPLE 6

A solution is prepared from 34.4 parts of 3-(3β,17β-dihydroxyandrost-5-en-17α-yl)propionic acid lactone and 400 parts of dichloromethane and the solution is cooled to 5° C. and maintained at or below that temperature as 7.3 parts of hydrogen chloride gas is passed in. Then, a solution 15.2 parts of N-bromoacetamide in 500 parts of dichloromethane is added over 5 minutes. The reaction is exothermic but the temperature is maintained below 15° C. by means of an ice bath. It is then removed from the ice bath and stirred for 75 minutes. A precipitate, which is acetamide hydrochloride, is filtered off and the dichloromethane solution is washed with 3 portions of water. The organic layer is then dried over sodium sulfate and filtered and the solvent is evaporated from the filtrate under reduced pressure. The solid residue is stirred with 120 parts of acetone as 150 parts of water is added gradually. The crystalline slurry is further diluted with an addition of 200 parts of cold water and the solid is separated by filtration, washed well with cold water, and air-dried to give a product which is largely 3-(5α-bromo - 6β - chloro-3β,17β-dihydroxyandrostan-17α-yl) propionic acid lactone. Trituration of this material with ethyl acetate gives the pure product melting at about 171–174° C.

Oxidation of the above product with Jones reagent by the procedure prescribed in Example 1B followed by dehydrohalogenation by the procedure described in Example 1C gives 3-(17β-hydroxy-3-oxoandrosta-4,6-dien-17α-yl)-propionic acid lactone in an overall yield of 84% for the three steps.

EXAMPLE 7

Following the procedure of Example 1A, 4.0 parts of α-picoline is converted to the hydrochloride salt in 50 parts of acetone. To this solution is added 8.3 parts of 22α-spirost-5-en-3β-ol followed by 4.0 parts of N-bromosuccinimide. The procedure is the same as Example 1A except that 40 parts of dichloromethane is added to the reaction mixture for better solution. The product finally obtained is a mixture of 5α-bromo-6β-chloro-22α-spirostan-3β-ol and 5α-chloro-6β-bromo-22α-spirostan-3β-ol.

The mixture of chlorobromides obtained in the preceding paragraph is oxidized with 8.5 parts by volume of Jones reagent in 32 parts of acetone according to the procedure described in Example 1B to give a mixture of 5α-bromo-6β-chloro-22α-spirostan-3-one and 5α-chloro-6β-bromo-22α-spirostan-3-one.

The mixture of chlorobromo ketones obtained in the preceding paragraph is added to a stirred mixture of 72 parts of N,N-dimethylformamide, 1.5 parts of lithium bromide, and 3.7 parts of magnesium oxide and heated to 120° C. The mixture is then heated rapidly to reflux and maintained at that temperature for 90 minutes. It is then cooled and the solvent is distilled off under reduced pressure with heating on a steam bath and the residue is diluted with 300 parts of water, 180 parts of ethyl acetate, and 12 parts of concentrated hydrochloric acid. The mixture is extracted into ethyl acetate, and the combined extracts are washed 3 times with water, once with 5% potassium carbonate solution, and twice with brine before being dried over sodium sulfate. The mixture is filtered and the solvent is evaporated from the filtrate under reduced pressure. The residue is dried at 0.1 m. pressure at about 50° C. to give 22α-spirost-4,6-dien-3-one. After crystallization from a mixture of acetone and dichloromethane, this material melts at about 210–212° C.

EXAMPLE 8

The procedure of Example 1A is repeated using 8.7 parts of 3β-hydroxyandrost-5-en-17-one, 6.0 parts of α-picoline, 2.2 parts of hydrogen chloride gas, 72 parts of acetone, and 5.9 parts N-bromosuccinimide. The product obtained is a mixture of 5α-bromo-6β-chloro-3β-hydroxy-androstan-17-one and 5α-chloro-6β-bromo-3β-hydroxy-androstan-17-one.

The alcohol obtained above is oxidized in 67 parts of acetone using 12.6 parts by volume of Jones reagent. The product obtained is a mixture of 5α-bromo-6β-chloro-androstane - 3,17 - dione and 5α-chloro-6β-bromoandrostane-3,17-dione.

The mixture of chlorobromodiones obtained above is dehydrohalogenated according to the procedure described in the second paragraph of Example 7 to give androsta-4,6-diene-3,17-dione.

EXAMPLE 9

The procedure of Example 1A is repeated using 9.1 parts of 17α-methylandrost-5-ene-3β,17β-diol, 6.0 parts of α-picoline, 2.2 parts of hydrogen chloride gas, 72 parts of acetone, and 5.9 parts of N-bromosuccinimide. In addition, 12 parts of dichloromethane is added to improve the solubility. The product obtained is a mixture of 5α-bromo-6β-chloro-17α-methylandrostane - 3β,17β - diol and 5α-chloro-6β-bromo-17α-methylandrostane-3β,17β - diol. The mixture of chlorobromides obtained is oxidized in 67 parts of acetone using 7.7 parts by volume of Jones reagent. The product obtained is a mixture of 5α-bromo-6-chloro-17β-hydroxy-17α-methylandrostan-3-one and 5α-chloro-6β-bromo-17β-hydroxy - 17α - methylandrostan-3-one.

Dehydrohalogenation of the mixture of chlorobromo ketones is carried out according to the procedure described in Example 1C to give 17β-hydroxy-17α-methylandrosta-4,6-dien-3-one.

EXAMPLE 10

42.9 parts of the chlorobromo ketone obtained by using the procedures of Example 3 and 1B, is mixed with 335 parts of N,N-dimethylformamide, 48.4 parts of collidine, and 8.0 parts of lithium bromide and stirred and heated at 120° C. After the addition is complete the mixture is heated to reflux and held at that temperature for 90 minutes. The product is then isolated from acetone-water as described in the procedure in Example 1C. The product obtained in this way is 3-(17β-hydroxy-3-oxoandrosta-4,6-dien-17α-yl)propionic acid lactone.

EXAMPLE 11

The procedures described in Examples 1A-C are repeated with the exception that, in the final step (Example 1C), equivalent quantities of tert-octylamine, N,N-diisopropylethanolamine, and dicyclohexylamine are each substituted for the tri-n-butyl amine used in Example 1C. The yield of 3-(17β-hydroxy-3-oxoandrosta-4,6-dien-17α-yl) propionic acid lactone from the 3-(3β,17β-dihydroxy-androst-5-en-17α-yl)propionic acid lactone was approximately 83–85.6% overall in all three cases.

What is claimed is:

1. A process for preparing 3-oxo-Δ$^{4,6}$-steroids of the androstane and spirostane series which comprises:
   (A) reacting a 3-hydroxy-Δ$^5$-steroid of the androstane and spirostane series with
      (1) a source of bromonium ion selected from the group consisting of N-bromoalkanamides and N-bromoimides and
      (2) a source of hydrogen chloride;
   (B) oxidizing the resultant chlorobromide with chromium trioxide to give the corresponding 3-ketone; and
   (C) treating the resultant chlorobromo ketone with a dehydrohalogenating agent selected from the group consisting of
      (1) magnesium oxide
      (2) tertiary amines and hindered secondary and primary amines, said amines having a boiling point of at least 130° C. under ordinary conditions.

2. A process for the preparation of 3-(17β-hydroxy-3-oxoandrosta-4,6-dien-17α-yl)propionic acid lactone according to claim 1 which comprises:
(A) reacting 3 - (3β,17β-dihydroxyandrost-5-en-17α-yl)propionic acid lactone with
(1) a source of bromonium ion selected from the group consisting N-bromoalkanamides and N-bromoimides
(2) a source of hydrogen chloride to give the corresponding 5,6-chlorobromo compound;
(B) oxidizing the chlorobromide with chromium trioxide to give the corresponding 5,6-chlorobromo-3-ketone; and
(C) treating the resultant chlorobromo ketone with a dehydrohalogenating agent selected from the group consisting of
(1) magnesium oxide
(2) tertiary amines and hindered secondary and primary amines, said amines having a boiling point of at least 130° C. under ordinary conditions.

3. A process for the preparation of 3-(17β-hydroxy-3-oxoandrosta-4,6-dien-17α-yl)propionic acid lactone according to claim 1 which comprises
(A) reacting 3 - (3β,17β-dihydroxyandrost-5-en-17α-yl)propionic acid lactone with N-bromosuccinimide and α-picoline hydrochloride to give the corresponding 5,6-chlorobromide;
(B) oxidizing the chlorobromide with chromium trioxide to give the 5,6-chlorobromo-3-ketone;
(C) dehydrohalogenating the chlorobromo ketone with an agent selected from the group consisting of
(1) magnesium oxide
(2) tertiary amines and hindered secondary and primary amines, said amines having a boiling point of at least 130° C. under ordinary conditions.

4. A process for the preparation of 3-(17β-hydroxy-3-oxoandrosta-4,6-dien-17α-yl)propionic acid lactone according to claim 1 which comprises:
(A) reacting 3 - (3β,17β-dihydroxyandrost-5-en-17α-yl)propionic acid lactone with N-bromosuccinimide and α-picoline hydrochloride to give the 5,6-chlorobromide;
(B) oxidizing the chlorobromide with chromium trioxide to give the 5,6-chlorobromo-3-ketone;
(C) heating the 5,6-chlorobromo-3-ketone with tri-n-butyl amine to give 3-(17β-hydroxy-3-oxoandrosta-4,6-dien-17α-yl)-propionic acid lactone.

5. 3 - (5α-bromo - 6β - chloro-3β,17β-dihydroxyandrostan-17α-yl)propionic acid lactone.

6. 3-(5α-bromo - 6β - chloro-17β-hydroxy-3-oxoandrostan-17α-yl)propionic acid lactone.

References Cited

UNITED STATES PATENTS 3,413,289  11/1968  Gal et al. _____ 260—239.57

HENRY A. FRENCH, Primary Examiner

U.S. Cl. X.R.

260—397.3, 397.4, 397.5, 999